Oct. 24, 1933. E. A. JOHNSTON ET AL 1,932,108
TRACK TYPE TRACTOR
Filed May 6, 1932 7 Sheets-Sheet 1

Inventors
E. A. Johnston
and D. B. Baker
By H. P. Dunlap
Atty.

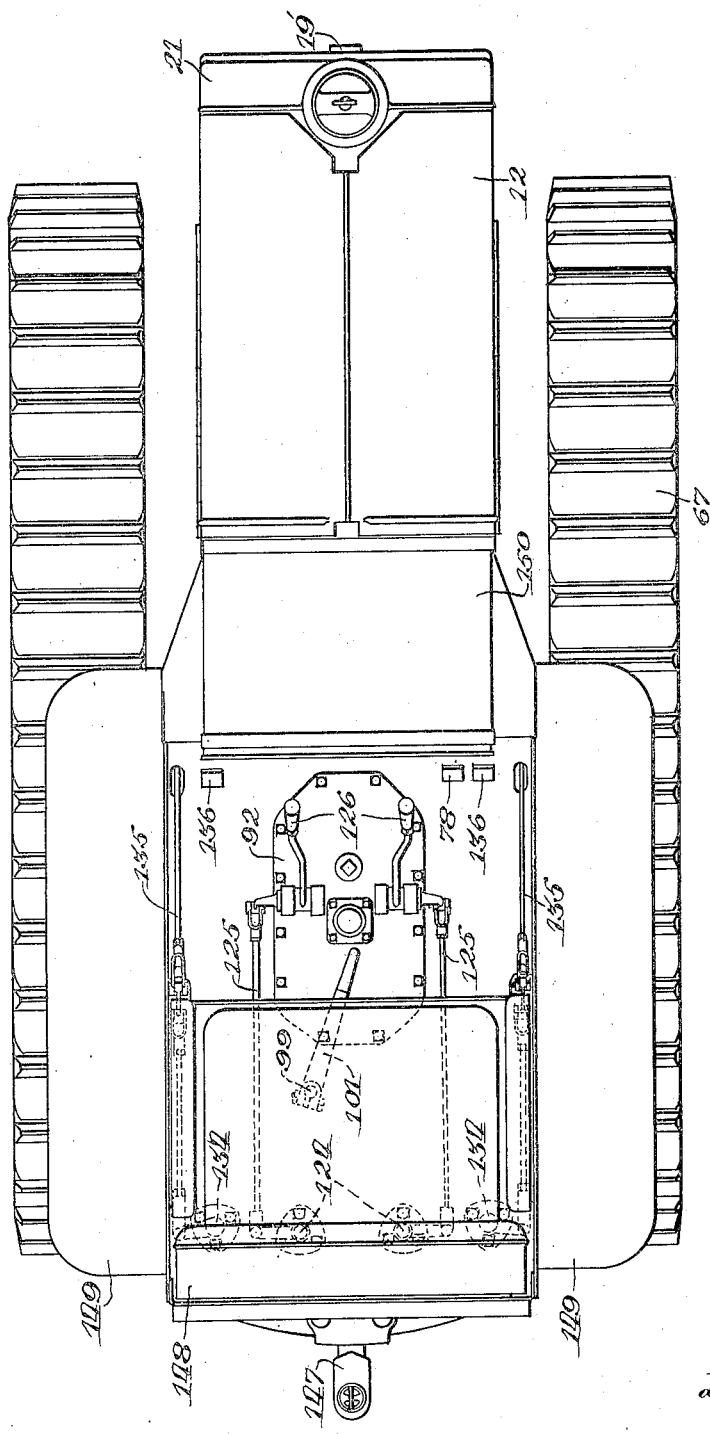

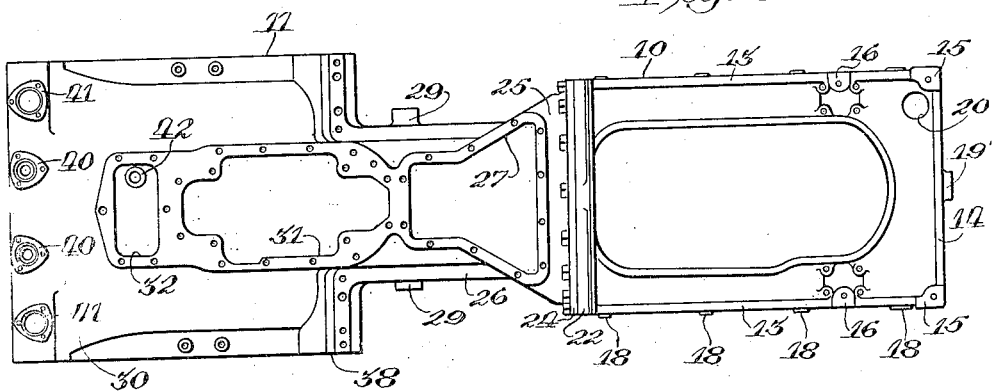

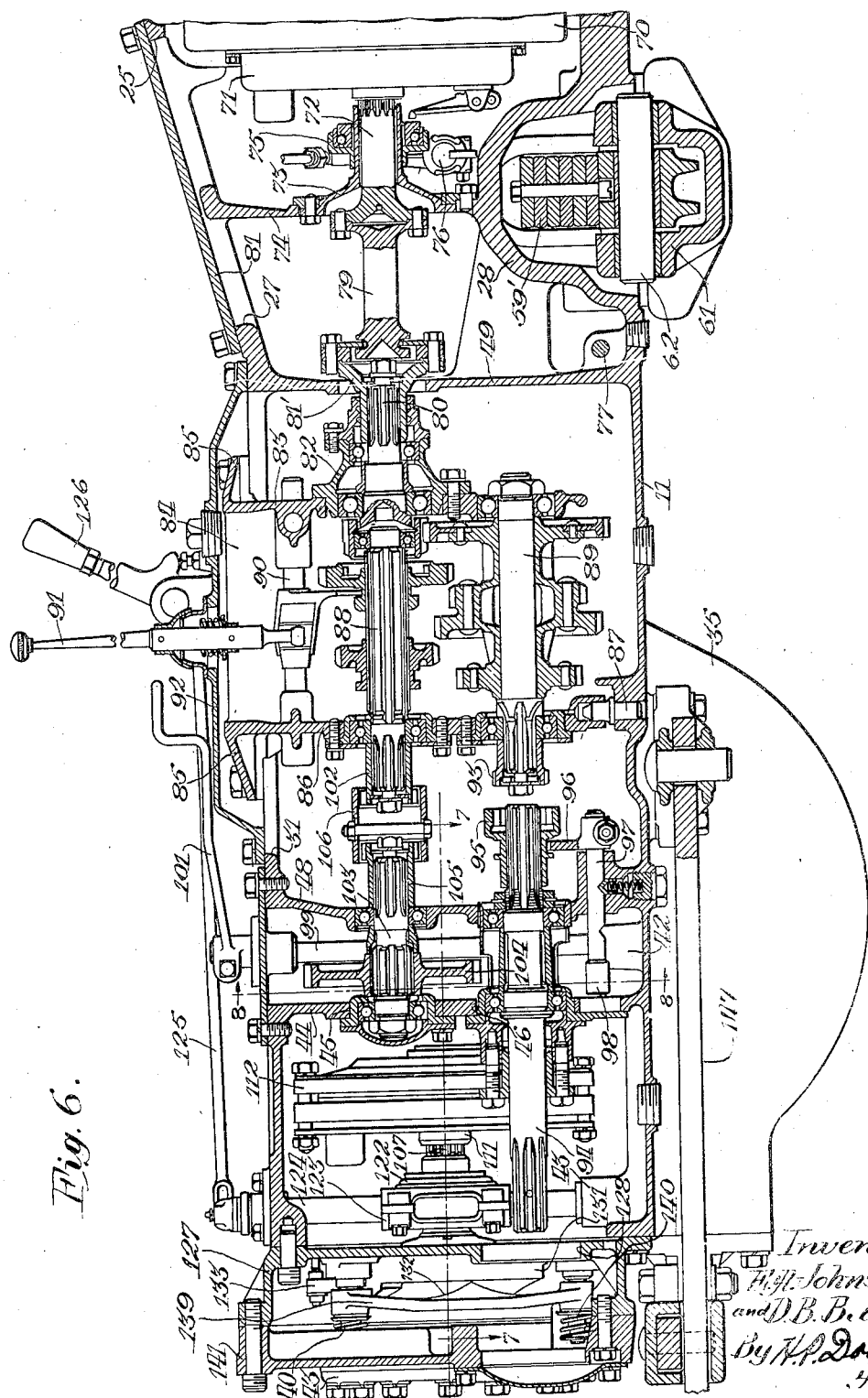

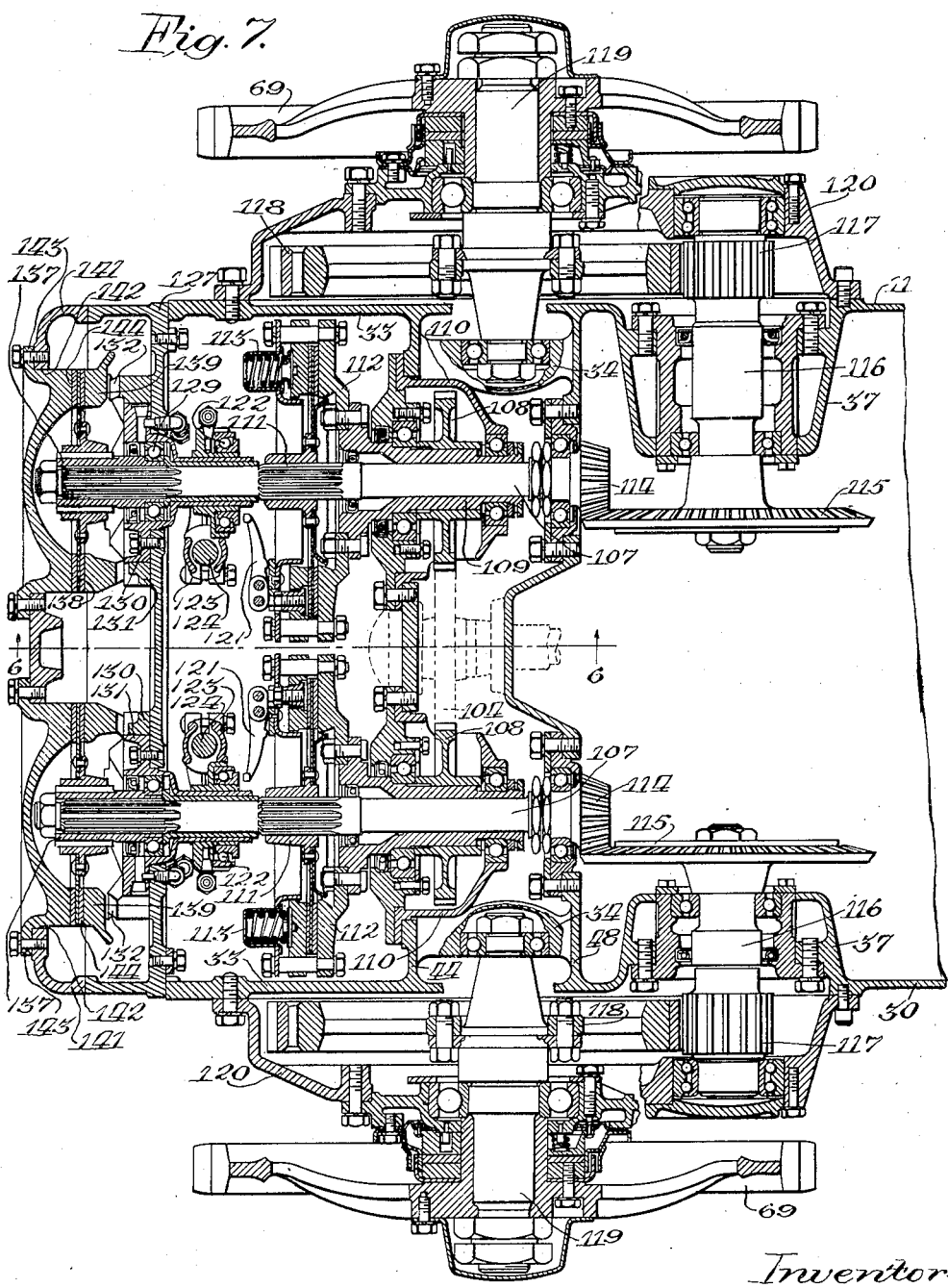

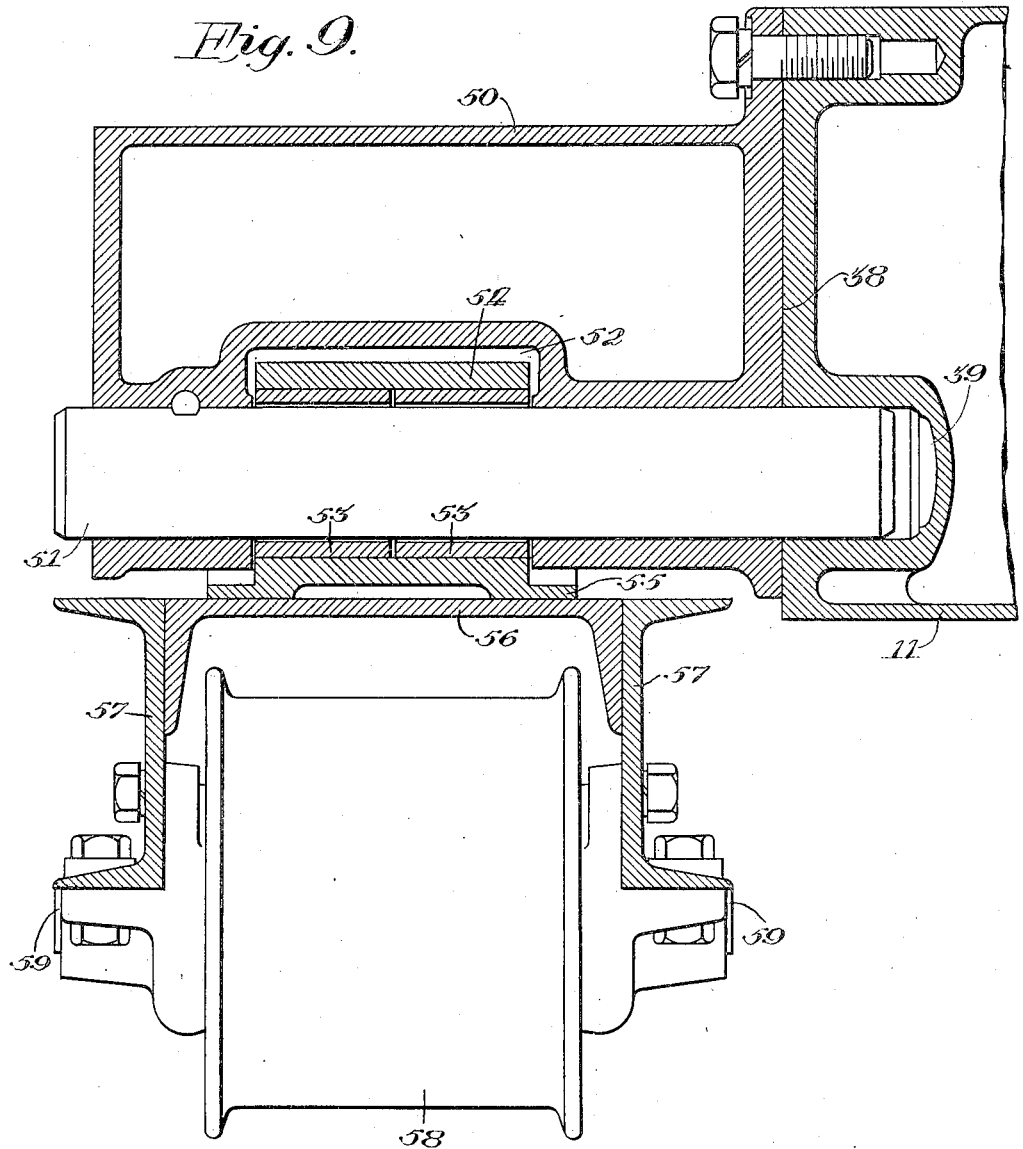

Patented Oct. 24, 1933

1,932,108

UNITED STATES PATENT OFFICE 1,932,108

TRACK TYPE TRACTOR

Edward A. Johnston, Chicago, and David B. Baker, Riverside, Ill., assignors to International Harvester Company, a corporation of New Jersey Application May 6, 1932. Serial No. 609,650

19 Claims. (Cl. 180—9.2)

The invention relates to track type tractors.

The objects of the invention are to provide a generally improved track type tractor especially useful for agricultural work; to make the design thereof compact; to provide an improved, sturdy main frame therefor; to provide an improved transmission, the same to be associated with the improved frame in a manner to make inspection and repairs convenient; to associate an improved steering control with such transmission; all of these features contributing to the production of a practicable, commercial design of tractor that will be properly balanced and capable of unusually easy maneuverability.

These objects, and others, will be made clear as the specification of the tractor is unfolded, a practicable form of the tractor being illustrated in the accompanying sheets of drawings, in which:

Figure 2 is a general plan view thereof;

Figure 3 is a top plan view of the assembled main frame;

Figure 4 is a side elevational view of the main frame;

Figure 5 is an elevational view of the rear end face of said main frame;

Figure 6 is a central longitudinal, side sectional view through the driving gearing from the engine flywheel bell housing back, the final drive portion of this view being taken along the line 6—6 appearing in Figure 7 when looking in the direction of the arrows;

Figure 7 is a horizontal plan view in section of the final drive and control assembly, as viewed along the line 7—7 appearing in Figure 6, looking in the indicated direction;

Figure 1:
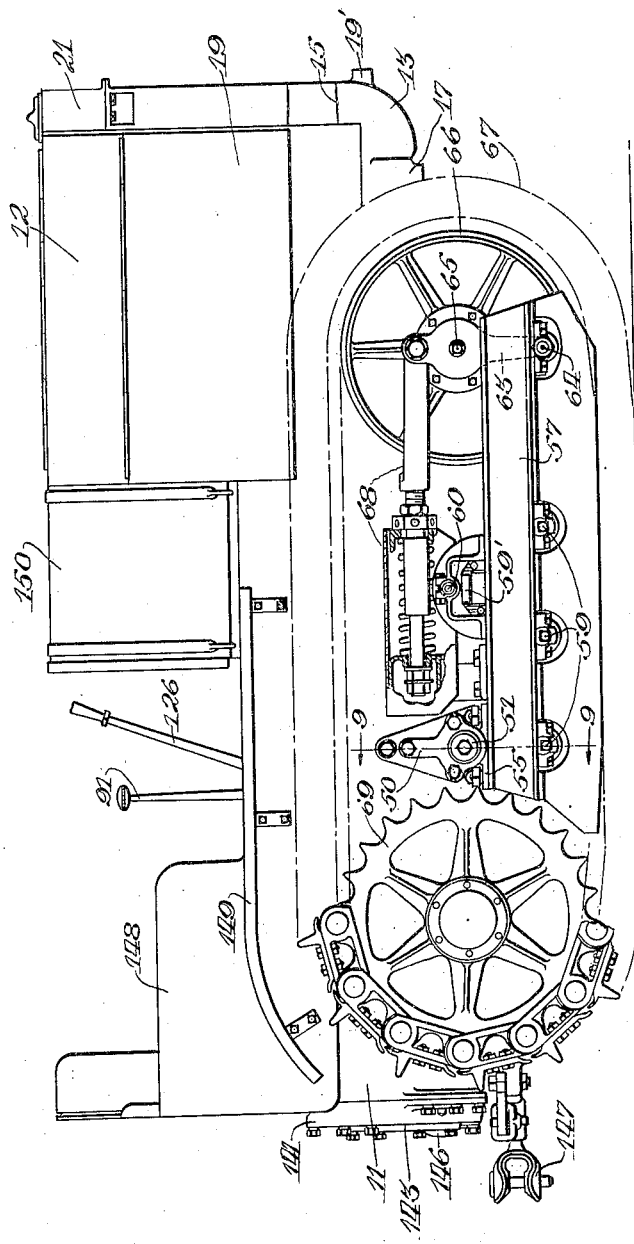
Figure 1 is a general side view of the tractor.

First of all it appears best to describe the main frame of the tractor, as shown in Figures 3, 4 and 5. Generally, the frame is composed of two main frame castings identified as the front part 10 and the rear part 11. The front part is of substantially rectangular shape in plan and serves mainly as the support for a motor 12, shown in Figures 1 and 2. The said frame part 10 is a shell open at its bottom, as shown. The casting includes walls which at their top sides are horizontally flat, as at 13, and similarly formed is a transverse front wall 14. At the front corners are raised pads 15 to mount the radiator for the motor, and near the front ends of the side walls are integrally formed raised pads to mount the motor. Directly below these transversely aligned pads 16, the side walls are formed with enlargements 17 which at their outer faces are vertically flat and apertured for the reecption of any suitable securing means, thus enabling the convenient attachment of implements to the main frame to be pushed by the tractor. A horizontally aligned, spaced series of integral pads 18 are also formed on the outer face of each wall 13, said pads apertured to receive fastening means for securing the sides of a hood 19 that covers the motor. The front wall 14 is centrally formed with an apertured boss 19' to mount an engine starting crank and a front corner of the frame part 10 adjacent a radiator pad 15 is provided with a downward opening 20 that serves to permit location of a drain for the radiator, said radiator appearing at 21 in Figures 1 and 2. While the major portion of the frame part 10 is relatively shallow in vertical dimensions, it will be noted that the rear end thereof flares perceptibly into an enlarged rear flange 22 presenting a flat vertical face to the rear fame part 11. This flange 22 or rear end wall, of course, is formed with a large, circular opening indicated at 23 by the dotted lines in Figures 3 and 4. The rear part 11 of the main frame constituting the support and enclosure for the driving and steering parts will next be described.

This frame part 11 is also integrally cast in one piece, the front portion thereof having a flange 24 which has an opening similar to that in the adjoining flange 22 heretofore described, said two flanges being securely bolted together, as shown in Figures 3 and 4, to assemble the frame parts rigidly together. The front portion of the frame part 11, just rearwardly of said flange 24, is relatively large to serve as a bell housing 25 for the master, or engine, clutch later to be described. See also Figure 6. From said bell housing rearwardly, this portion of the rear frame part, along its upper side, slopes downwardly and has parallel side faces lying in vertical planes and spaced apart in a manner causing this portion of the frame to be relatively narrower than the front unit 10. This mid-portion of the entire frame is numbered 26 and houses the engine flywheel assembly, the top of the mid-portion 26 being appropriately open on top, as at 27, for purposes of inspection. Furthermore, the bottom of said mid-portion is raised to form a narrow, transverse tunnel 28 immediately to the rear of the bell housing portion 25, said tunnel, as will later be described, to receive a transverse equalizer member connected between the auxiliary or side track layer units to support the forward end of the main frame thereon in a manner well known in this art. Immediately to the rear of said tunnel 28 this mid-portion 26 is formed with transversely aligned, apertured bosses 29 for a purpose later to appear.

It will be noted in Figures 3 and 4 that the narrow mid-portion at its rear flares out laterally at right angles to form a relatively wide integrally connected box or casing part 30, said part, as shown, being substantially square with the sides thereof planed flat in parallel vertical planes; and the rear face similarly planed flat in a vertical plane and disposed at a right angle to the sides. The top of this rear part is closed except for a front opening 31 and a rear opening 32. Opposite sides of this box 30 are concaved, as at 33, (see also Figure 8), to form a substantially circular inset in the casting which at its center includes transversely aligned depressions 34. As this depression is in the center of the concaved part 33, which center is approximately at the level of the floor or bottom of the box 30, it follows that the lower half or the circular concave 33 must appear as a downwardly projected, integral extension 35. The upper front portion of each concave 33 is eccentrically extended ahead, as at 36, to locate inwardly extending sleeves 37 (see Figure 7) which are in transverse alignment and integrally formed as part of the casting. At opposite sides, the box 30, in advance and below the sleeves 37, is formed with thickened portions 38 (see also Figure 9) formed with transversely aligned recesses 39. Said portions 38 are planed flush with the sides of the box 30, and the front faces of said portions 38 constitute the right angular extension of the narrow middle portion 26 heretofore described.

In transverse alignment along the rear top edge of the rear casting 30 are four vertically apertured bosses comprising two inner bosses 40 and two outer bosses 41 for a purpose later to appear. Similarly, an apertured boss 42 is provided on the floor of the rear casting 30 (see Figures 3 and 6). It is to be noted in the rear view, Figure 5, that the bottom of the casting 30 has two vertically apertured bosses 43 in line, vertically, with the upper bosses 40 heretofore described. Viewing Figures 5 and 6, it will be seen that immediately to the rear of the boss 42 the casting includes an integral, transverse, vertical wall 44, which along its vertical center line is formed with an upper opening 45 and a lower opening 46, while on each side thereof is a large opening 47. Spaced slightly ahead of the wall 44 is another transverse wall 48 and toward the front end of the box and slightly to the rear of the bosses 29 (see Figure 6), is another transverse wall 49. Thus, as will later appear, between walls 48 and 49 is provided the lubricated transmission chamber; between walls 44 and 48 is another gear chamber; and, to the rear of the wall 44, is a dry, clutch chamber, all as will later more fully appear.

Looking especially at Figures 1 and 9, it will be seen that each thickened portion 38 of the main frame has connected to its outer flush face, by means of bolts, solid cast brackets 50 of substantial I-beam section, that extend laterally in the manner shown. Passed through a bore in each bracket is a stub shaft, or trunnion 51 held in place in the bracket 50 against rotation, as shown, said shaft having its inner end seated in the recess 39 heretofore described. Formed in the bottom of each bracket 50 is an upwardly extended arched passage 52, open at the bottom, as shown. The shaft 51 passes through this passage where it is surrounded by bushing sleeves 53. Carried on these bushings is a pivot sleeve member 54 freely turnable on the shaft 51. The bottom of the sleeve 54 is formed flat at 55, whereby said sleeve may be rigidly bolted in any suitable manner to the upper surface of the top member 56 of the track frame comprising spaced sides 57, which in any desirable manner carry three spaced truck rollers 58 on the pins 59. It will be especially interesting to note that the sleeve 54 is permitted an ample amount of looseness or play between the ends of the sleeve 54 and the end walls of the arched passage-way 52, as shown in Figure 9. Thus, in addition to a free up and down pivotal movement, each track frame or roller truck 57 may have a slight lateral movement to prevent cramping and twisting thereof, which may occur due to the transverse equalizer spring bar 59', which is connected between the two forwardly extending track frames 57, as shown in Figures 1 and 2, by means of shackle connections 60 in advance of the track frame pivots 51.

Midway between its ends, said equalizer spring bar 59 is passed through the frame casting tunnel 28, heretofore described, thus making for compactness and general stability which goes with a low center of gravity and proper balance. A bracket 61 (see Figure 6) is appropriately bolted in proper place in the frame tunnel 28, said bracket being bifurcated, and carries a longitudinally disposed pivot pin 62, upon which pin the equalizer is pivotally mounted to support the mid and front portions of the main frame at a single point. The rear portion of the main frame, as has been described, is carried at two points 51. Thus there is provided an improved form of the well known three-point main frame suspension principle commonly employed in this art. It will be noted that the equalizer bar on the pin 62 is permitted a free fore and aft shifting movement to a slight extent, because the bar 59' is narrower than the space between furcations of the bracket 61. Thus, as the side truck frames pivot in operation over uneven ground about pivots 51, the ends of the equalizer bar 59' are carried up or down therewith about pivot pin 62. The play provided at the pivots 51 and on pin 62, therefore, compensates for the lengthening and shortening tendency displayed in the arcuate movement of the ends of the equalizer bar and the intermediate ends of the side truck frames, thereby preventing cramping and twisting strains from the track units from being imparted to the main frame and the parts carried thereby.

The forward end of each track frame 57 carries an upright lever 63 pivoted at 64 to said frame. This lever structure carries a pin 65 (see Figure 1) for rotatably mounting a front idler wheel 66 around which an endless track 67 is trained in the usual manner. A rod and spring assembly 68 is connected to the lever 63 and carried on the frame 57 to position the idler 66 and to cushion the same. The rear portions of the endless tracks are trained around the usual driving sprocket wheels 69 (see Figure 7) carried by the main frame independently of the side trucks 57. The manner of and structure for driving and controlling these sprocket wheels 69 will now be described.

As appears in Figure 6, the motor is indicated by its flywheel 70 arranged in the housing part 25. Associated in a conventional manner with the flywheel is the master or engine clutch 71, the driven part of which is fast on an engine clutch shaft 72 that is passed through a sleeve plate 73 carried in a vertical wall 74 integrally cast in the frame part directly above the tunnel 28. A conventional clutch release collar 75 is slidably carried on the sleeve 73 and operable from a shaft 76 to release the clutch. The shaft 76 has any appropriate connection (not shown) with a transverse foot pedal shaft 77 carried in the frame bosses 29. Through linkage, not shown, the shaft 77 has connection with a convenient foot pedal 78 (Figure 2) to operate the clutch.

By means of a suitable coupling 79, which extends through a hole in the wall 49, the clutch shaft 72 is connected to a rearwardly extending, longitudinally aligned transmission drive shaft 80. The chamber forwardly of the wall 49 is open at its top and provided with a removable cover 81 to make these parts described accessible for inspection and repairs.

The coupling 79 includes a splined sleeve 81', into which the front end of shaft 80 is splined. The rear end of the shaft 80 is appropriately carried in bearings mounted in a collar 82 mounted in the forward transverse wall 83 of a rectangularly shaped cage 84, as shown best in Figure 6, said cage having outwardly extending flanges 85 at its top, that hang over and are detachably bolted to the top of the body casing 30, which, as has previously been described, is open at 31 for the very purpose of removably receiving the sliding gear or speed change transmission unit. The rear wall of the cage 84 is also transversely disposed and appears at 86, the lower edge of the same being appropriately apertured to fit over one or more guide dowel pins 87, to aid in the proper placing of the cage relative to the body 30 and associated parts. This cage 84 is open at its bottom to permit free splash circulation of lubricant in a manner well understood.

The cage 84 described contains a conventional three speed forward and one speed reverse sliding gear speed change transmission, which embodies the usual spline shaft 88 and transmission counter-shaft 89 and a reverse gear, idler shaft, not shown. The speed change gears shown on the spline shaft 88 are slidable therealong to mesh the gears on the counter-shaft in the usual way, by means of the sliding key structure 90 also carried by the cage 84 and operable manually by a gear shift lever 91 mounted in a removable cover that closes opening 31, said cover 92 thus enclosing also the open top of the cage 84. Thus, the walls 83, 86 of the cage carry the shafts and gears thereon, of the transmission as a unit.

The rear end of counter-shaft 89 projects through the wall 86 of the cage where it carries a gear coupler 93. In longitudinal alignment to the rear, and spaced from coupler 93, the wall 48 carries a power take-off shaft 94, which extends rearwardly through wall 44 and terminates in a splined rear end substantially flush with the rear end of the body casting 30. The front end of shaft 94 is splined forwardly of wall 48 and slidingly carries a gear coupling element 95 complementary to coupler 93 on shaft 89. By means of a shifter fork 96 on a sliding key 97, the coupler element 95 may be meshed with coupler 93, thus to drive the power take-off shaft 94 from the counter-shaft of the sliding gear transmission speed change unit. The key 97 is connected by a lever 98 in any suitable manner to a vertically disposed rockshaft 99 set in the apertured frame boss 42 already described. The top end of shaft 99 protrudes upwardly through a cover plate 100, that closes opening 32, said top end of the shaft having connected thereto a forwardly extending lever 101 accessible to the operator for controlling operation of the power take-off shaft, said shaft being adapted for connection to driven elements of an implement or other tool connected to the tractor and drawn thereby, to drive said elements in a manner understood in this art.

The rear end of the spline shaft 88 of the speed change unit also extends rearwardly through the rear cage wall 86, where it carries a gear coupler element 102 (Figure 6). Carried in the walls 44, 48 is a short longitudinal shaft 103 carrying fast thereon a relatively large spur pinion 104 between the two walls mentioned. (See also Figure 7.) The forward end of shaft 103 projects slightly ahead through the wall 48 where it carries a gear coupler element 105. These couplers 102, 105 are rigidly connected by means of a coupler sleeve 106, thus aligning the shafts 88 and 103.

By removing the sleeve 106 and clutch coupler 79, it is possible to raise the cage 84 and the entire sliding gear transmission out of the body as a unit through opening 31 after the cover 92 has first been removed.

As seen in Figures 5 and 6, the shaft 103 is mounted in opening 45 in the rear wheel 44 and the power take-off shaft 94 is journaled in the opening 46 in said wall 44.

On each side of the longitudinal outer line of the tractor final drive, shown best in Figure 7, it will be seen that the walls 48 and 44 carry longitudinally disposed, parallel, driven and steering control shafts 107; each of which carries thereon between the walls 44, 48, a spur gear 108, each always in mesh with the pinion 104 (see also Figure 8) to be driven therefrom, said gears 108 carried loose on the shafts through the mediary of quills 109, said quills 109 being mounted only in the wall 44 through the sleeves 110. Just to the rear of wall 44, each shaft 107 carries a steering clutch part 111 of a conventional one plate disc clutch, while the complementary part of each clutch part 111 is shown at 112 and rigidly carried by the rear flared end of the quills 109. Normally, by the usual springs 113, the parts 111, 112 are frictionally pressed together so that the quills 109 are locked with the shafts 107, causing the two to rotate together. The forward end of each shaft 107, in advance of wall 48, carries a fast, small bevel pinion 114, each in mesh with relatively large bevel gears 115, which are carried fast on short, transversely aligned counter-shafts 116, each appropriately journaled in the frame sleeves 37 already described. The gears 114, 115 are meshed in a manner to cause the counter-shafts 116 to turn together in the same direction.

Spaced slightly outwardly of the concaves 33, through which shafts 116 project, it will be observed from Figure 7 that each shaft carries a small spur pinion 117 meshed with larger spur gears 118 arranged to the rear, and also adjacent the concaves 33 of the frame. Gears 118 are fast on short, transversely aligned, stub shafts 119 appropriately journaled at their inner ends in the frame pockets 34. At their outer ends both the shafts 116 and 119 are properly journaled in dust proof and oil tight covers 120 bolted to the sides of the body 30, to cover the gearing described and the concaves 33. Each shaft 119 at its outer end passes through the covers 120 where it carries exteriorly of said covers the track chain driving sprocket wheels 69 heretofore described.

During straight-away travel of the tractor, the clutches 111, 112 are normally in to cause driving torque to be passed uniformly through the gear trains described, and to the sprocket drive wheels 69. When it is desired to turn the tractor for steering purposes, then either clutch 111, 112 may be released, so that the drive to the associated wheel 69 is cut out, thereby permitting the opposite side to drive alone in accordance with the well known practice in this art of steering by driving through clutches. Accordingly, the clutches 111, 112 may be released by release levers 121 movable through release collars 122 which, in turn, are slid along a sleeve on shafts 107 by means of shifters 123. These shifter arms 123 are moved by vertically disposed rockshafts 124 to which they are connected, said rockshafts 124 extending upwardly through holes 40 in the top of body casting 30, where they are connected to suitable linkage 125 controlled each by a separate hand lever 126, as shown in Figure 2. The lower ends of the rockshafts 124 rest and turn in the apertured bosses 43 shown in Figures 5 and 6 at the bottom of body casting 30.

A casing 127 (see Figures 6 and 7) is bolted to the open rear end of the body part 30, said casing provided with a wall having a hand hole 128 to make the rear end of the power take-off shaft 94 accessible. The wall part of said casing 127 is provided with suitable journal bearings 129 through which the rear ends of the parallel, longitudinal shafts 107 pass, said wall carrying a fixed collar 130 surrounding the projected rear end of each shaft 107. Surrounding each collar and abutting the wall is a cam ring 131 formed with cam faces 132 and turnable on the collars by means of a crank 133, (see Figure 6), suitably linked to vertical stub shafts 134 (Figure 2) mounted in the casting openings 41 (Figures 3 and 5). Said stub shafts, as appears in Figure 2, are rockable by linkage 135 operable from two foot pedals 136 arranged one at each side of the body. The rear ends of shafts 107 also carry splined sleeves 137 (Figure 7), to the outer surface of which is splined a hub carrying a clutch brake disk 138. As shown in Figure 6, the rear face of the wall of the case 127 carries a spring pressed ring 139 adjacent each cam ring 131, said ring 139 having a friction face, as shown in Figure 6, abutting a similar face on the clutch brake disk 138. Said faces on the ring 131 and disk 138 are normally held apart by the springs 140 on the ring 139. The back, open side of the case 127 is closed by a cover 141 bolted to the case and provided with two large hand holes 142 closed by plates 143 bolted to the cover 141. The inner faces of the plates are formed each with a friction faced ring 144 in such a manner that the disks 138 are disposed between the two friction rings 139 and 144. By actuating either foot pedal 136, the linkage 135 turns the selected shaft 134, causing the associated cam ring 131 to press ring 139 in a manner to clamp disk 138 between the two friction members 139—144, whereby to clutch brake the connected shaft 107 to retard and lock the same. In this manner the steering action of the clutches 111, 112 is augmented by a braking action to make the steering control positive. An appropriate hand hole 145 is covered by a removable plate 146, thereby making the power take-off shaft conveniently accessible.

A drawbar 147 in any desirable manner may be connected to the body casting 30, preferably to the rear face thereof, or its under side.

Figure 8:
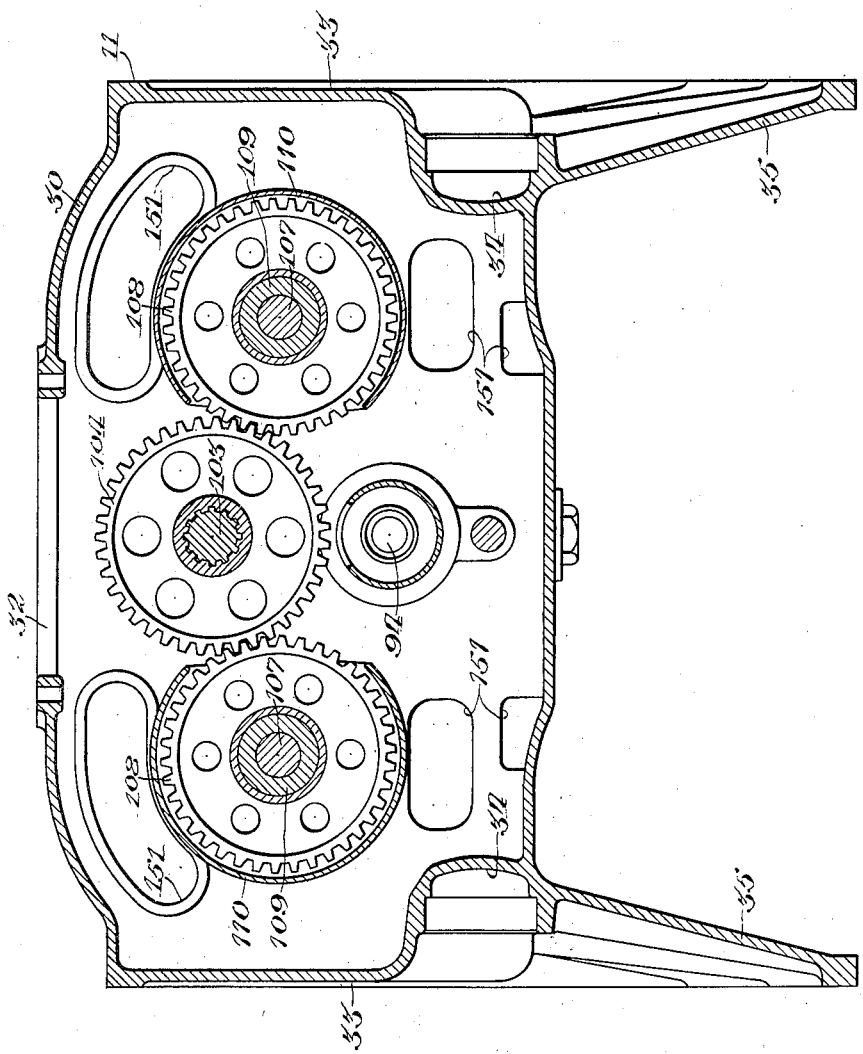
Figure 8 is a rear sectional view of the final drive and frame, as would be seen along the section line 8—8 in Figure 6, when looking in the direction of the arrows; and, Figure 9 is an enlarged sectional view through the hanger for mounting the track laying supplementary frames on the main frame, as seen along the section line 9—9 appearing in Figure 1 and looking toward the rear.

As shown in Figure 8, the wall 48 is provided with openings 151 to permit splash circulation of oil.

Looking to Figures 1 and 2, it will be seen that an operator's seat 148 is located on the body 30 at its rear in a position to make all controls conveniently accessible. Fenders are shown at 149, and a fuel tank at 150. The operation of the improved tractor will now be described.

In assembling the tractor, it will be noted that the flanges at the rear of the front frame piece 10 and at the front of the rear frame piece 11 are securely bolted together to constitute a unitary main frame which carries the motor on the front part and the driver's seat with his controls on the rear part. This unitary frame is mounted on the roller truck frames 57 in accordance with the established three-point suspension principle, the two rear points being on the trunnions 51 and the front point being on the pin 62 through the equalizer 59', the ends of which are carried on the truck members 57. The trucks 57 carry the front idlers 56 and the rear frame part 11 or 30 carries the rear driving sprocket wheel 69 on the stub shafts 119. The endless chain track 67 surrounds the sprocket wheel and front idler wheel in the usual manner with the rollers 58 of the trucks 57 riding on the rail faces of the track in the conventional manner.

The motor for driving the tractor is carried on the front frame part 10 in the manner described, its flywheel appearing at 70, and through the clutch element 71, coupler 79, the torque is transmitted to a conventional three speed forward and one speed reverse sliding gear transmission formed as a unit in that it is carried in a cage 83 between the walls 48 and 49 of the body casting 30. This transmission is controllable in the usual manner by a shift lever 91 and, for the purpose of inspection and making repairs, the cover plate 92 is removable, to permit bodily removal of the cage 83 with the entire sliding gear transmission upon appropriate disconnection of the coupler 79 and coupler 106. By means of a coupler 93, a power take-off shaft 94 may be driven from said sliding gear transmission unit to drive implements or other tools attached to the drawbar 147 of the tractor.

A sliding gear transmission unit from its shafting 88 drives the gear 104 which in turn always drives the gears 108 on the quills 109 in turn carried on the two parallel driving and steering control shafts 107. These quills 109 are each connectible by clutch elements 111, 112 to drive shafts 107. Accordingly, these clutches 111, 112, which are normally in or engaged, cause the shafts 107 to be driven from the gear 108, so that the drive is transmitted through gears 114, 115 to turn shafts 116, gears 117, 118, then shafts 119, which carry the sprocket drive wheel 69. For turning movement, either clutch 111, 112 may be disengaged by the operator through the levers 126. Thus, with one side running and the other side idle, the tractor is steered in the well known steering by driving by clutching manner, the principles of which are well established in this art. To augment the steering action, either shaft 107 may additionally be retarded and locked by clutch brakes 138 operable in the manner described from pedals 136.

By removing the rear cover 141, the clutch brakes 138 are made quickly accessible for adjustment, inspection, or repairs, and, by removing the entire casing 127, the entire rear end of the tractor transmission and steering control mechanism is made conveniently accessible.

From this detailed disclosure it will now be apparent that an improved tractor construction has been provided which achieves the desirable objects of the invention heretofore recited.

It is the intention to cover herein all such changes and modifications as do not depart from the spirit and scope of the invention, which is defined in the following claims.

What is claimed is:

1. The combination with a track type tractor having a frame comprising a rear box portion, of transversely aligned stub shafts carried one each in each side of the box and projecting laterally thereof, track driving wheels carried on said stub shafts, an engine driven shaft centrally and longitudinally entering the front of said box, a pair of spaced transverse walls in the box, said engine driven shaft journaled in said walls and carrying a pinion between said walls, a pair of longitudinally disposed parallel shafts arranged one each on each side of said engine driven shaft, a quill surrounding each parallel shaft and journaled only in the rearward of said walls, each quill carrying a gear meshed with said pinion, the front end of each parallel shaft being journaled in the forward one of said walls and extending therethrough each carrying a bevel pinion on its projected front end, aligned stub counter-shafts carried in the box sides in advance of the track drive wheel shafts and projecting laterally of the frame sides, bevel gears on the inner ends of the counter-shafts in mesh with said bevel pinions, gears connecting the outer ends of the counter-shafts and the inner ends of the drive wheel shafts to drive the latter, a clutch on the rear end of each parallel shaft and quill normally to lock the quills and shafts for conjoint rotation, and means to release either clutch.

2. The combination with a track type tractor having a frame comprising a rear box portion, of transversely aligned stub shafts carried one each in each side of the box and projecting laterally thereof, track driving wheels carried on said stub shafts, an engine driven shaft disposed longitudinally and entering the front of said box, said engine driven shaft journaled in the box and carrying a pinion, a pair of longitudinally disposed parallel shafts arranged one each on each side of said engine driven shaft, a quill surrounding each parallel shaft, each quill carrying a gear meshed with said pinion, the front end of each parallel shaft being journaled in the box and carrying a bevel pinion, aligned stub counter-shafts carried in the box sides in advance of the track drive wheel shafts and projecting laterally of the frame sides, bevel gears on the inner ends of the counter-shafts in mesh with said bevel pinions, gearing connecting the outer ends of the counter-shafts and the inner ends of the drive wheel shafts to drive the latter, a clutch on the rear end of each parallel shaft and quill normally to lock the quills and shafts for conjoint rotation, and means to release either clutch.

3. The combination with a track type tractor having a frame comprising a rear box portion, of transversely aligned stub shafts having their inner ends carried in pockets formed one each in each side of the box with said shafts projecting laterally thereof, track driving wheels carried on said stub shafts, an engine driven shaft centrally and longitudinally entering the front of said box, said engine driven shaft carrying a pinion, a pair of longitudinally disposed parallel shafts arranged one each on each side of said engine driven shaft, a quill surrounding each parallel shaft, each quill carrying a gear meshed with said pinion, the front end of each parallel shaft carrying a bevel pinion, aligned stub counter-shafts carried with their inner ends in inwardly extending sleeves formed in the box sides in advance of the track drive wheel shafts and projecting laterally of the frame sides, bevel gears on the inner ends of the counter-shafts in mesh with said bevel pinions, gearing connecting the outer ends of the counter-shafts and the inner ends of the drive wheel shafts to drive the latter, said gearing located partly in concaved sides of the box, covers enclosing the gearing and carrying bearings for the outer ends of the stub shafts, a clutch on the rear end of each parallel shaft and quill normally to lock the quills and shafts for conjoint rotation, and means to release either clutch.

4. The combination with a track type tractor having a frame comprising a rear box portion having an open rear transverse face and concaves at its sides, of transversely aligned stub shafts carried one each in each side of the box and projecting laterally thereof from the concaves, track driving wheels carried on the outer ends of said stub shafts, an engine driven shaft centrally and longitudinally entering the front of said box, said engine driven shaft carrying a pinion, a pair of longitudinally disposed parallel shafts arranged one each on each side of said engine driven shaft, a quill surrounding each parallel shaft, each quill carrying a gear meshed with said pinion, the front end of each parallel shaft carrying a bevel pinion, aligned stub counter-shafts carried in the box side concaves in advance of the track drive wheel shafts and projecting laterally of the frame sides, bevel gears on the inner ends of the counter-shafts in mesh with said bevel pinions, gearing adjacent the concaves connecting the outer ends of the counter-shafts and the inner ends of the drive wheel shafts to drive the latter, a cover enclosing each concave and the gearing adjacent thereto, said covers carrying the outer ends of the stub shafts, a clutch on the rear end of each parallel shaft and quill normally to lock the quills and shafts for conjoint rotation, means to release either clutch, and a cover closing the rear open end of the box.

5. The combination with a track type tractor having a frame comprising a rear box portion, of transversely aligned stub shafts carried one each in each side of the box and projecting laterally thereof, track driving wheels carried on said stub shafts, an engine driven shaft entering the front of said box, a pair of spaced transverse walls in the box, said engine driven shaft journaled in said walls, a pair of spaced longitudinally disposed parallel shafts arranged in the box, a quill surrounding each parallel shaft, means between the said walls for driving the quills from the engine driven shaft, the front end of each parallel shaft being journaled in the forward one of said walls and extending therethrough, aligned stub counter-shafts carried in the box sides in advance of the track drive wheel shafts and projecting laterally of the frame sides, means operatively connecting the parallel shafts with the stub counter-shafts to drive the latter, means connecting the outer ends of the counter-shafts and the inner ends of the drive wheel shafts to drive the latter, a clutch on the rear end of each parallel shaft and quill normally to lock the quills and shafts for conjoint rotation, and means to release either clutch.

6. The combination with a track type tractor having a frame comprising a rear box portion having an open rear transverse face, of transversely aligned stub shafts carried one each in each side of the box and projecting laterally thereof, track driving wheels carried on said stub shafts, an engine driven shaft centrally and longitudinally entering the front of said box, a pair of longitudinally disposed parallel shafts arranged one each on each side of said engine driven shaft, a quill surrounding each parallel shaft, means to drive the quills from the engine shaft, aligned stub counter-shafts carried in the box sides in advance of the track drive wheel shafts and projecting laterally of the frame sides, means to drive the stub counter-shafts from the parallel shafts, gearing connecting the outer ends of the counter-shafts and the inner ends of the drive wheel shafts to drive the latter, a clutch on the rear end of each parallel shaft and quill normally to lock the quills and shafts for conjoint rotation, means to release either clutch, a change speed transmission unit in the front part of the box to drive the engine driven shaft, a power take-off shaft in the box arranged longitudinally and below the parallel shafts, said power take-off shaft extending to the rear end of the box, and means for operatively connecting said power take-off shaft to an element of the change speed transmission.

7. The combination with a track type tractor having a frame comprising a rear box portion having an open rear transverse face, of transversely aligned stub shafts carried one each in each side of the box and projecting laterally thereof, track driving wheels carried on said stub shafts, an engine driven shaft centrally and longitudinally entering the front of said box, a pair of spaced transverse walls in the box, said engine driven shaft journaled in said walls and carrying a pinion between said walls, a pair of lingitudinally disposed parallel shafts on opposite sides of said engine driven shaft, a quill surrounding each parallel shaft, each quill carrying a gear meshed with said pinion, the front end of each parallel shaft being journaled in the forward end of said walls and extending therethrough each carrying a bevel pinion on its projected front end, aligned stub counter-shafts carried in the box sides in advance of the track drive wheel shafts and projecting laterally of the frame sides, bevel gears on the inner ends of the counter-shafts in mesh with said bevel pinions, gears connecting the outer ends of the counter-shafts and the inner ends of the drive wheel shafts to drive the latter, a clutch on the rear end of each parallel shaft and quill normally to lock the quills and shafts for conjoint rotation, means to release either clutch, a change speed transmission unit in the front part of the box in advance of the front wall to drive the engine driven shaft, a power take-off shaft journaled in the pair of walls and extending longitudnally to the rear of the box, an upright rockshaft journaled in the box between the two spaced walls, means for rocking the shaft, and means operable from the shaft for operatively connecting the power take-off shaft to an element of the change speed transmission.

8. The combination with a track type tractor having a frame comprising a rear box portion having an open rear transverse end, of transversely aligned stub shafts carried one each on each side of the box and projecting laterally thereof, track driving wheels carried on said stub shafts, an engine driven shaft centrally and longitudinally entering said box at its front, a pair of longitudinally disposed parallel shafts arranged one each on each side of the box, a quill on each parallel shaft driven from the engine shaft, a normally engaged clutch making the driving connection between each quill and shaft, means for driving the stub shafts from the parallel shafts, a casing bolted to the rear end of the box and having an open rear end, a cover for said rear open end of the casing, clutch brake elements on the rear ends of the parallel shafts and between the casing and cover therefor, four vertical rockshafts journaled in the rear end of the box, cam means for applying the brake clutches to retard and lock the parallel shafts, two of said rockshafts being connected to operate the cam means, and the other two rockshafts being connected to release the clutches.

9. The combination with a track type tractor having a frame comprising a rear box portion having an open rear transverse end, of transversely aligned stub shafts carried one each on each side of the box and projecting laterally thereof, track driving wheels carried on said stub shafts, an engine driven shaft centrally and longitudinally entering said box at its front, a pair of longitudinally disposed parallel shafts arranged one each on each side of the box, a quill on each parallel shaft driven from the engine shaft, a normally engaged clutch making the driving connection between each quill and shaft, means for driving the stub shafts from the parallel shafts, a casing bolted to the rear end of the box and having an open rear end, a cover for said rear open end of the casing, clutch brake elements on the rear ends of the parallel shafts and between the casing and cover therefor, four vertical rockshafts journaled in the rear end of the box with the upper ends projecting upwardly through the top of the box and arranged in transverse alignment, means for applying the brake clutches to retard and lock the parallel shafts, two of said rockshafts being connected to operate the clutch brake applying means, and the other two rockshafts being connected to release the clutches.

10. The combination with a track type tractor having a frame comprising a rear box portion having an open rear transverse end, of transversely aligned stub shafts carried one each on each side of the box and projecting laterally thereof, track driving wheels carried on said stub shafts, an engine driven shaft centrally and longitudinally entering said box at its front, a pair of longitudinally disposed parallel shafts arranged one each on each side of the box, a quill on each parallel shaft driven from the engine shaft, a normally engaged clutch making the driving connection between each quill and shaft, means for driving the stub shafts from the parallel shafts, a casing bolted to the rear end of the box and having an open rear end, a cover for said rear open end of the casing, clutch brake elements on the rear ends of the parallel shafts and between the casing and cover therefor, means for applying the brake clutches to retard and lock the parallel shafts, and means to release the clutches.

11. The combination with a track type tractor having a frame comprising a rear box portion having an open rear transverse end, of transversely aligned stub shafts carried one each on each side of the box and projecting laterally thereof, track driving wheels carried on said stub shafts, an engine driven shaft centrally and longitudinally entering said box at its front, a pair of longitudinally disposed parallel shafts arranged one each on each side of the box, a quill on each parallel shaft driven from the engine shaft, a normally engaged clutch making the driving connection between each quill and shaft, means for driving the stub shafts from the parallel shafts, a casing bolted to the rear end of the box and having an open rear end, a cover for said rear open end of the casing, clutch brake elements on the rear ends of the parallel shafts and between the casing and cover therefor, means for applying the brake clutches to retard and lock the parallel shafts, means to release the clutches, and means removably connecting the cover to the casing to make clutches and clutch brakes accessible for inspection.

12. The combination with a track type tractor having a frame comprising a rear box portion having an open rear transverse end, of transversely aligned stub shafts carried one each on each side of the box and projecting laterally thereof, track driving wheels carried on said stub shafts, an engine driven shaft centrally and longitudinally entering said box at its front, a pair of longitudinally disposed parallel shafts arranged one each on each side of the box, a quill on each parallel shaft driven from the engine shaft, a normally engaged clutch making the driving connection between each quill and shaft, means for driving the stub shafts from the parallel shafts, a casing bolted to the rear end of the box and having an open rear end, a cover for said rear open end of the casing, clutch brake disks on the rear ends of the parallel shafts between the casing and cover therefor, said cover having hand holes in line with the disks, a plate closing each hand hole and carrying a friction face lining, a friction faced ring forwardly of each disk carried by the casing, means for applying the brake clutches by clamping the disk between the ring and plate to retard and lock the parallel shafts, and means to release the clutches.

13. The combination with a track type tractor having a frame comprising a rear box portion having an open rear transverse end, of transversely aligned stub shafts carried one each on each side of the box and projecting laterally thereof, track driving wheels carried on said stub shafts, an engine driven shaft centrally and longitudinally entering said box at its front, a change speed transmission unit in the front part of the box to drive the engine driven shaft, a pair of longitudinally disposed parallel shafts arranged one each on each side of the box, a quill on each parallel shaft driven from the engine shaft, a normally engaged clutch making the driving connection between each quill and shaft, means for driving the stub shafts from the parallel shafts, a casing bolted to the rear end of the box and having an open rear end, a cover for said rear open end of the casing, clutch brake elements on the rear ends of the parallel shafts and between the casing and cover therefor, means for applying the brake clutches to retard and lock the parallel shafts, means to release the clutches, a power take-off shaft arranged longitudinally below and between the parallel shafts and driven from an element of the change speed transmission, said cover for the casing having handholes in line with the clutch brakes and power take-off shaft, and removable plates covering said handholes.

14. The combination with a track type tractor having a frame comprising a rear box portion having an open rear transverse end, of transversely aligned stub shafts carried one each on each side of the box and projecting laterally thereof, track driving wheels carried on said stub shafts, an engine driven shaft centrally and longitudinally entering said box at its front, a pair of longitudinally disposed parallel shafts arranged one each on each side of the box, a quill on each parallel shaft driven from the engine shaft, a normally engaged clutch making the driving connection between each quill and shaft, means for driving the stub shafts from the parallel shafts, a casing bolted to the rear end of the box and having an open rear end, clutch brake elements on the rear ends of the parallel shafts between the casing and cover therefor, means for applying the brake clutches to retard and lock the parallel shafts, means to release the clutches, and a cover for the rear end of the casing, said cover carrying friction elements forming part of the clutch brakes.

15. The combination with a track type tractor having a frame comprising a rear box portion having an open rear transverse end, of transversely aligned stub shafts carried one each on each side of the box and projecting laterally thereof, track driving wheels carried on said stub shafts, an engine driven shaft centrally and longitudinally entering said box at its front, a pair of longitudinally disposed parallel shafts arranged one each on each side of the box, a quill on each parallel shaft driven from the engine shaft, a normally engaged clutch making the driving connection between each quill and shaft, means for driving the stub shafts from the parallel shafts, a casing bolted to the rear end of the box and having an open rear end, a cover for said rear open end of the casing, clutch brake elements on the rear ends of the parallel shafts and between the casing and cover therefor, four vertical rockshafts journaled in the rear end of the box, means for applying the brake clutches to retard and lock the parallel shafts, two of said rockshafts being connected to operate the brake applying means, the other two rockshafts being connected to release the clutches, two independent hand levers for rocking the two rockshafts that release the clutches, and two independent foot levers for rocking the two rockshafts that apply the clutch brakes.

16. The combination with a track type tractor having a frame comprising a rear box portion having an open rear transverse end, of transversely aligned stub shafts carried one each on each side of the box and projecting laterally thereof, track driving wheels carried on said stub shafts, an engine driven shaft centrally and longitudinally entering said box at its front, a pair of longitudinally disposed parallel shafts arranged one each on each side of the box, a quill on each parallel shaft driven from the engine shaft, a normally engaged clutch making the driving connection between each quill and shaft, means for driving the stub shafts from the parallel shafts, a casing bolted to the rear end of the box and having an open rear end, a cover for said rear open end of the casing, clutch brake elements on the rear ends of the parallel shafts and between the casing and cover therefor, means for applying the brake clutches to retard and lock the parallel shafts, means to release the clutches, two independent hand levers for operating the clutch releasing means, and two independent foot levers for operating the clutch brake applying means.

17. The combination with a track type tractor having a frame comprising a rear box portion, of transversely aligned shafts carried in the box sides and projecting laterally thereof, track driving wheels carried on said shafts, an engine driven shaft supported in the box, a pair of coaxial shaft and quill assemblies longitudinally supported in spaced relation in the box, said assemblies each including a normally engaged clutch for turning each assembly as a unit, means operatively connecting said assemblies to be driven from said engine driven shaft, transversely aligned countershafts supported in the box forwardly of the track drive wheel shafts and projecting laterally of the box sides, means operatively connecting the shaft and quill assemblies with the counter-shafts to drive the latter, means driving the track drive wheels from the counter-shafts, means to release the clutches independently, the rear face of the box portion being open, separate brake means in the rear portion of the box operative on each of the shaft and quill assemblies, independent control means for the separate brake means, and a removable closure element for the rear open end of the box.

18. The combination with a track type tractor having a frame comprising a rear box portion, of transversely aligned shafts carried in the box sides and projecting laterally thereof, track driving wheels carried on said shafts, an engine driven shaft supported in the box, a pair of coaxial shaft and quill assemblies longitudinally supported in spaced relation in the box, said assemblies each including a normally engaged clutch for turning each assembly as a unit, means operatively connecting said assemblies to be driven from said engine driven shaft, transversely aligned countershafts supported in the box forwardly of the track drive wheel shafts and projecting laterally of the box sides, means operatively connecting the shaft and quill assemblies with the counter-shafts to drive the latter, means driving the track drive wheels from the counter-shafts, means to release the clutches independently, separate brake means in the box operative respectively on each of the shaft and quill assemblies, and control means for independently applying the brake means.

19. The combination with a track type tractor having a frame comprising a rear box portion, of transversely aligned shafts carried in the box sides and projecting laterally thereof, track driving wheels carried on said shafts, an engine driven shaft supported in the box, a pair of coaxial shaft and quill assemblies longitudinally supported in spaced relation in the box, said assemblies each including a normally engaged clutch for turning each assembly as a unit, means operatively connecting said assemblies to be driven from said engine driven shaft, transversely aligned countershafts supported in the box spaced from the track drive wheel shafts and projecting laterally of the box sides, means driving the counter-shafts from the shaft and quill assemblies, means driving the track drive wheels from the counter-shafts, control means for independently releasing the clutches, a brake for each shaft and quill assembly, and control means for independently applying the brake means.

EDWARD A. JOHNSTON.
DAVID B. BAKER.